(12) United States Patent
Simmons (10) Patent No.: US 7,716,820 B2
(45) Date of Patent: May 18, 2010

(54) ROTATIONAL APPARATUS FOR WELDING BEAM-MOUNT STRUCTURE TO THE SIDE(S) OF A COLUMN

(75) Inventor: Robert J. Simmons, Hayward, CA (US)

(73) Assignee: ConXtech, Inc., Hayward, CA (US)

( * ) Notice: Subject to any disclaimer, the term of this patent is extended or adjusted under 35 U.S.C. 154(b) by 31 days.

(21) Appl. No.: 12/080,863

(22) Filed: Apr. 7, 2008

(65) Prior Publication Data

US 2008/0245021 A1    Oct. 9, 2008

Related U.S. Application Data

(62) Division of application No. 10/938,909, filed on Sep. 9, 2004.

(60) Provisional application No. 60/503,071, filed on Sep. 14, 2003.

(51) Int. Cl.
*E04C 3/00* (2006.01)
*E04G 21/14* (2006.01)

(52) U.S. Cl. ............................. 29/822; 29/700; 29/823; 29/824; 52/749.1

(58) Field of Classification Search .............. 29/897.35, 29/434, 822–824, 700; 52/749.1, 745.2, 52/745.21, 747.1, 836, 843, 848, 854, 646, 52/637, 648.1, 236.7, 653.1, 653.2, 655.1, 52/721.4, 726.4, 726.1, 745.17, 745.18, 745.19; 403/170–178, 403

See application file for complete search history.

(56) References Cited

U.S. PATENT DOCUMENTS

| | | | | |
|---|---|---|---|---|
| 3,824,661 A | * | 7/1974 | Dobson et al. | 29/897.33 |
| 3,877,129 A | * | 4/1975 | Dobson et al. | 29/281.4 |
| 4,480,383 A | * | 11/1984 | Yoshioka et al. | 29/822 |
| 5,289,665 A | * | 3/1994 | Higgins | 52/655.1 |
| 5,355,576 A | * | 10/1994 | Miller | 29/431 |
| RE36,541 E | * | 2/2000 | Rossi | 228/6.1 |
| 7,621,099 B2 | * | 11/2009 | Simmons | 52/745.17 |

* cited by examiner

*Primary Examiner*—Jeanette Chapman
(74) *Attorney, Agent, or Firm*—Jon M. Dickinson, PC; Robert D. Varitz, PC (57) ABSTRACT

Apparatus for precision deploy-attaching beam-mount structure to the outside of an elongate column at plural, defined attachment sites that are distributed and spaced along the length of the column. During use, a column support jig with plural openable/closeable yokes in the apparatus supports a column horizontally for selective rotation about its long axis. A carriage in the apparatus, which holds beam-mount structures to be attached to a supported column, is selectively moveable and position-lockable in defined locations distributed along the supported column between yokes in a pair of spaced yokes to enable precision weld-attaching of the mounts to sides of the column.

2 Claims, 9 Drawing Sheets

ROTATIONAL APPARATUS FOR WELDING BEAM-MOUNT STRUCTURE TO THE SIDE(S) OF A COLUMN

CROSS REFERENCES TO RELATED APPLICATIONS

This application is a Division of U.S. patent application Ser. No. 10/938,909, filed Sep. 9, 2004, for "Rotational Method and Apparatus for Welding Beam-Mount Structure to the Sides of a Column", which application claims priority to the filing date of U.S. Provisional Patent Application Ser. No. 60/503,071, filed Sep. 14, 2003 for "Rotational Method and Apparatus for Welding Beam-End Attaching Components to the Side of a Column". The contents of those prior-filed, U.S. patent applications are hereby incorporated herein by reference.

BACKGROUND AND SUMMARY OF THE INVENTION

This invention pertains to building frame structure, and in particular to an apparatus for performing precision-placement, and deployment-attaching and welding, of plural beam-end attaching components, referred to also herein as beam mounts, and as beam-mount structure, to plural spaced regions, or sites, that are distributed along the outer sides of elongate, hollow-tube steel columns, which sites are disposed angularly about the long axes of such columns. Especially, it relates to such deployment-attachment and welding which is conducted in an efficient and precision manner that introduces no noticeable column warping, or other heat-induced deformation, even in extremely long unitary columns, such as those having lengths, for example, of many story-heights (up to, for example, about four to about eight stories).

For a number of important reasons which include, among other things, a desire for large strength-to-weight ratios in columns, tubular steel columns are highly desirable for use in plural-story buildings. Especially long, unitary columns are also desirable in that they can greatly reduce building-frame assembly time by minimizing the number of column-to-column (stack) connections that are necessary to achieve full building-frame height. Such columns, however, can present challenges during manufacture, and later during assembly with beams, regarding which (in both cases) there are manufacturing and assembling steps wherein it is conventional that high heat (due to welding operations) is (or may be) involved. Such heat can prove to be a difficult culprit (a) during manufacture where a column can warp or twist (even slightly) during cool-down, and (b) during building-frame assembly where extreme local hot regions created during welding operations can introduce similar undesirable, and often difficult to correct or manage, deformations.

There is a recently developed building-frame system with respect to which the present invention offers particular utility. This system is described in U.S. Pat. No. 6,837,016, issued Jan. 4, 2005, covering an invention entitled "Moment-Resistant Building Frame Structure Componentry and Method". This patent describes a type of collar-form, precision interconnect structure which is employed in a building frame to interconnect upright columns and horizontal beams. The collar form of interconnection illustrated and described in this patent is generally illustrated herein in drawing FIG. 1—a fragmentary picturing of this system which provides a background for developing an understanding of the basic principals, the structure and the operation of the apparatus of the present invention. As will be seen in FIG. 1, the interconnect system shown there, collar-form in nature, includes what are referred to in the referenced patent as inner and outer collar members, the inner ones of which, referred to herein as beam mounts, are designed to be attached, as by welding, to outside faces in a generally square cross section, tubular steel column, and the outer members in which are intended to be attached, as by welding, to the ends of I-beams which are to be anchored to the sides of columns. These outer members are also referred to as beam-end attaching components, or members. The inner and outer collar members complementarily interconnect in a gravity-seating manner through complementary, bevel-edged male and female interface substructures.

The desirability of employing hollow tubular columns in a building frame structure has thus been outlined generally above for background reasons, and as will now be seen, the present invention involves a unique apparatus for deploying and weld-attaching beam mounts in clusters which are appropriately distributed along the length of, and on the outside surfaces, or sides, of such a column. Such deployed and attached beam mounts ultimately provide attaching (anchoring) locations for the ends of beams equipped with a beam-end attaching component, such as those mentioned above, and generally illustrated in FIG. 1. Very specifically, the present invention offers a unique apparatus which enables precision, and non-heat-deforming, deploying and attaching of clusters of such beam mounts to the outer sides in such a column. Use of the apparatus of the invention is also referred to herein both as implementation, and as practice, of the invention.

As will be seen, the apparatus of the present invention is employable completely, and advantageously, in an off-site manner, and under precision control, including computer and robotic control if desired, so as to prepare columns for delivery to a building site with beam-mounts accurately secured in place on undeformed elongate columns, and thus without there being any requirement for on-site workers to conduct any welding or attaching of such mounts to a column.

The preferred apparatus and its use in implementing the invention, as has just been suggested, is described and illustrated herein with reference to preparing an elongate, tubular, square cross section column with clusters of beam mounts—four per cluster, with each such four-mount cluster having, essentially, a single-building-story longitudinal separation, or spacing, along the column from each next-adjacent beam-mount cluster. The four mounts in a cluster are disposed (one each) on the four individual faces of such a column.

In this implementation, an elongate jig is provided in accordance with the teachings and preferred apparatus of the present invention. In this jig, swing-up-swing-down end (and if desired intermediate) stands carrying appropriate idler support rollers are located along an elongate frame which forms part of this jig to receive a horizontally placed "raw" column which, as suggested earlier herein, may have a length up to, say, as much as about eight building stories. For the purpose of illustration herein, such a column is illustrated with a considerably shorter length in order to employ, in the drawings, a more appropriate scale for an understanding of the invention. In the jig, a "raw" column placed on these stands rests at a predetermined elevation, and can be shifted to a proper longitudinal position, as will be explained, as accommodated by the idler rollers which are present in the just-mentioned support stands.

At locations spaced along the jig frame, and thus along the length of a stand-supported column, where particular column support is to be furnished during use of the apparatus of the invention, and typically with what is referred to herein as a single-building-story longitudinal separation, removable, circular-perimeter guide rings, or rings, are attached to the outside of a stand-supported column. Opposed, openable/closeable swing-arm yokes whose arms carry appropriate idler rollers are distributed in and along the jig. With a column supported on the mentioned stands, and the mentioned guide rings attached to the outside of that column, the arms in these yokes are closed to engage their arm-carried idler rollers with the perimeters of the attached rings. Such closing action of the yoke arms operates to lift the column from the support stands (which are then appropriately lowered to be out of the way), with the guide rings and yokes then (a) maintaining the column in essentially a horizontal condition, (b) stabilizing the column longitudinally, and (c) accommodating, importantly, selective rotation of the column substantially about its own long axis. Such rotation is specifically accommodated by the rolling inter-engagement which exists between the perimeters of the attached column guide rings and the idler rollers which are carried on the opposed swing-arms of the yokes. The significance of such selective rotatability will become apparent.

Generally in this condition of things, an elongate, squirrel-cage carriage is suitably mounted on a supported column through sets of engaging idler rollers which are mounted on, and disposed adjacent opposite ends, of the carriage. These rollers (a) permit low-resistance shifting, or translating, of the carriage along the column, with the column thus significantly acting as a travel way for the carriage, and at the same time (b) effectively "lock" the carriage and column for rotation as a unit with rotation of the column about its own long axis (as accommodated by the attached rings and the supporting idlers rollers carried on the swing-arms in the yokes).

The carriage is designed with appropriate precision-positioned mounting, or staging, structure prepared to carry "clusters" of deployable and attachable beam mounts (four mounts per cluster), with such carried beam mounts being orthogonally related to one another on the carriage about the long axis of a column (with the carriage in place on the column). The mentioned clusters are, during implementation of the invention, to be weld-attached as a part of deployment to the four outside faces of a supported column at distributed attachment sites that are spaced along the column. Preferably, these attachment sites, with the column in place supported by the yokes, are located longitudinally relatively closely adjacent the yokes. Proper longitudinal positioning, or indexing, of the carriage with respect to these sites is accommodated, for example, by a shiftable locking pin which is carried on the carriage, and which can be moved into locking contact with a previously prepared small recess, or bore, provided in a side of a column (one recess or bore associated with each beam-mount cluster attaching site). With the carriage mounted on a column, the long axis of the carriage is substantially coincident with the long axis of the then associated column.

The reference just above made to precision positioning regarding the carriage-carried mounting structure for beam mounts is very significant. This precision positioning is such that the four mounts in a cluster thereof held by the carriage are precisely positioned relative to one another, whereby when they become attached to the sides of a column, no matter whether there is some kind of a modest column deformity at the location of attachment, the resultingly column-attached beam mounts will function with precision, close-tolerance correctness in the ultimately assembled building frame wherein they function to interconnect beam ends with the column.

The carriage has what are referred to herein as upstream and downstream ends, and during practice of the invention the carriage is moved progressively downstream along the column, from attachment site to next-adjacent attachment site, between the yokes. Movement from one attachment site to the next is accomplished and accommodated by opening of the appropriate yoke arms, and by temporary removal of the associated attached column collar, so as to the permit free passage of the carriage past the location of that yoke. The downstream-end idler rollers on the carriage which are interposed the carriage and a supported column, which end always faces that length-portion of a supported column to which no beam mounts have yet been attached to the column faces, are disposed to engage and ride directly upon the column faces. The upstream-end carriage idler rollers, however, are disposed to engage and ride upon the column corners which define the intersections of the column faces. These upstream rollers need to "ride clear" of all just-previously deployed and attached beam mounts as the carriage is moved downstream along a column during practice of the invention.

As will become apparent to those skilled in the art, while practice of the present invention is specifically described herein in conjunction with a particular style of beam mount, intended for use in a particular style of precision building frame structure (as will be more fully described), other types of beam-mount structures, and the like, may readily be accommodated by an appropriate modification of the structure of the invention. Such a modification will, as needed, become fully appreciated by those skilled in the art.

When the carriage is indexed and located properly adjacent a yoke and an associated column attachment site for the attachment of a cluster of beam mounts, tack welding is performed, either manually, or, if desired, under robotic computer control, during deploy-attaching of a carriage-carried and supported cluster of beam mounts, with a selected pattern of attachment-related column and carriage rotation taking place between successive tack-welding operations. More specifically, and at each given beam-mount-attaching location along a column, tack welding is performed with respect to the edges of a pair of beam mounts which are upwardly facing at the time of tack welding (as will be described with reference to two different illustrations provided herein). Following this operation, the beam and carriage are rotated preferably 180° about the beam's own long axis to expose another set of beam-mount edges for tack-welding and attachment. Such tack welding is then performed with respect to these edges, and immediately thereafter, the beam and carriage are subjected to a second rotational operation—this time a 90° rotation—to expose yet another pair of upwardly-facing beam-mount edges for tack welding and attachment. Such attachment and welding is performed then for these now upwardly exposed edges, and immediately thereafter, a third beam and carriage rotation takes place, again through an angle of about 180° to expose the still unattached and final two beam-mount edges for upwardly facing tack attachment. If desired, during all of this deployment and tack-welding activity which is accommodated by the invention, a flow of heating or cooling gas, such as ambient air, or intentionally heated air, may be directed through the hollow interior of the beam to aid in intentional pre-heating and/or cooling-down after welding.

Such rotational deployment and attachment activity, with a column supported as described, and with attachment taking place at locations which are disposed closely adjacent the yokes in the mentioned jig structure, has demonstrated that heat-introduced column deformation simply does not occur in any noticeable and undesirable manner.

As will be seen from the description which is presented below, following deployment-attachment of the beam mounts in a cluster of such mounts at a given location along the length of a supported column, the appropriate supporting swing-arm yoke can be "opened" to allow the carriage to be shifted downwardly (i.e., downstream) along the column toward the next site for beam-mount attachment. The rolling contact structure which is interposed the carriage and a supported column allows for such carriage movement, with appropriate clearance provided for the just-attached beam mounts. The manner in which previously supported and carried beam mounts were carried on the carriage allows these beam mounts and the carriage to "part company" with one another as the carriage shifts downwardly along the subject column.

Following movement of the carriage away from a site where deployment-attachment has just taken place, the guide ring and yoke adjacent that location are returned to conditions appropriately supporting the column, and of course, the carriage is moved to the next-adjacent attachment-site location. At that location the carriage is re-equipped, or re-armed, with another set, or cluster, of beam mounts in readiness for the next deployment-attachment operation.

The various features and advantages of the invention will now become more fully apparent as the detailed description thereof which follows is read in conjunction with the accompanying drawings.

DESCRIPTION OF THE DRAWINGS

FIG. 3 illustrates attached conditions for the beam mounts in this cluster wherein they are preliminarily deployed and welded to the four faces in the illustrated column.

DETAILED DESCRIPTION OF THE INVENTION

Figures 1, 2:
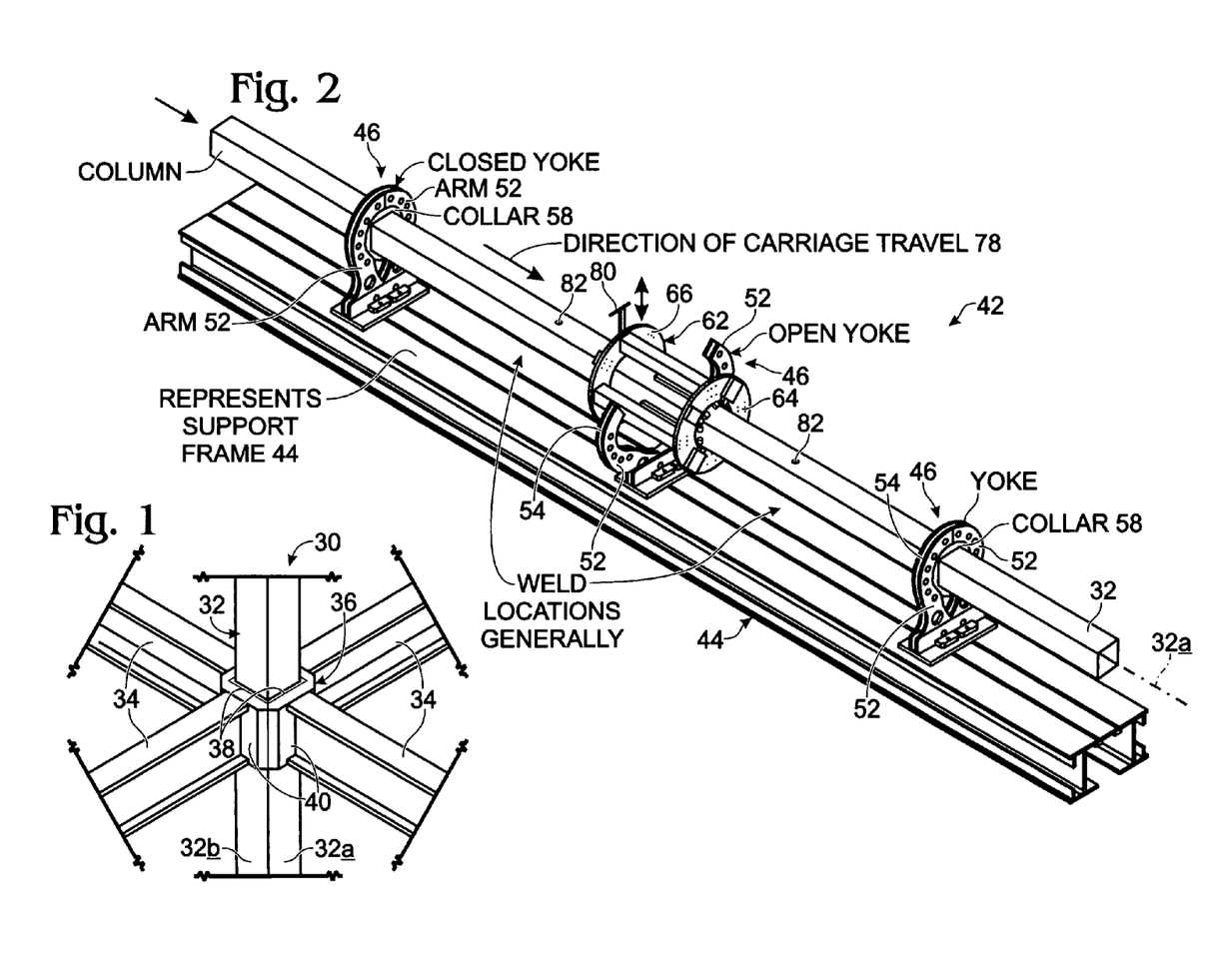
FIG. 1 is a fragmentary isometric view of a precision building frame in which the ends of four beams are shown connected through inner and outer collar interconnect components to the outer faces of a tubular, square cross section steel column. It is with respect to the inner collar components, referred to herein as beam mounts, as column-face specific beam mounts, and collectively as beam-mount structure, that the apparatus of the present invention is particularly described.
FIG. 2 is a somewhat simplified isometric view of jig-structure apparatus constructed in accordance with the present invention.
Figure 3:
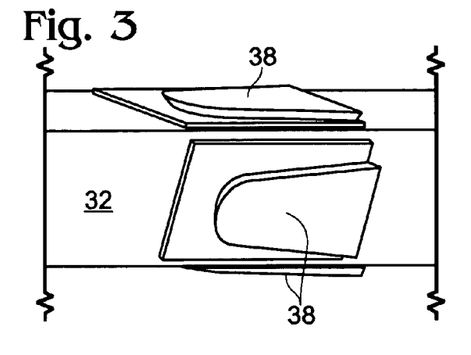
FIG. 3 is a fragmentary view of a horizontally disposed elongate column, such as the column pictured in FIGS. 1 and 2, illustrating a cluster of beam mounts which have been attached to the sides of that column in accordance with use of the apparatus of the present invention. Specifically.

Turning now to the drawings, and referring first of all to FIG. 1, illustrated fragmentarily and generally, and also in a somewhat simplified form, at 30 in this figure are portions of a precision, close-tolerance structural building frame which has been constructed in accordance with the teachings of above-referred-to U.S. Pat. No. 6,837,016. Frame structure 30 includes upright tubular, square cross section elongate steel columns, such as the single column shown at 32, two orthogonally related outside faces of which are seen in FIG. 1 at 32a, 32b.

Joined to the four orthogonally related faces, such as faces 32a, 32b, in column 32 are the ends of four horizontal I-beams, such as those shown at 34, with these I-beams being joined to column 32 through a style of collar interconnect structure 36 which has been constructed in accordance with the teachings of the referenced '016 patent. More specifically, collar interconnect structure 36 is made up of a cluster of four column-face-secured inner collar members, also referred to herein as beam mounts, 38, which are designed to interconnect, through gravity-mating male and female interface structures, with beam end components 40 which are appropriately attached, as by welding, to the nearby ends of beams 34. As can be seen, the beam mounts and the beam end components are ultimately organized, in an assembled frame structure such as frame structure 30, in clusters containing four each of these two different kinds of components. Clusters are distributed along the length of columns, such as along the length of column 32, separated by essentially single story heights for a particular intended building frame.

The present invention is concerned with enabling the use of hollow tubular steel columns, such as column 32, and specifically promoting the precision deployment and weld-attachment of clusters of beam mounts, such as beam mounts 38, at predetermined attaching sites located with an appropriate distribution along the lengths of the columns. As has been mentioned earlier, while the present invention is now being described in conjunction with beam mounts such as those generally shown at 38 in FIG. 1, and with respect to collar-form interconnect structure between columns and beams, as generally pictured in FIG. 1, it should be appreciated by those skilled in the art that the jig assembly apparatus of the present invention, soon to be described, may be employed with other kinds of beam-mount structures intended for weld-attachment to the outside surfaces of hollow, elongate columns, such as to the outside surfaces of column 32.

With attention directed now to FIG. 2, here shown generally at 42 is an elongate jig, or jig structure, including an elongate frame 44 on and along which, at appropriately distributed locations, there are included plural yokes, or yoke structures, such as the three shown in FIG. 2 at 46. Preferably, the interfacial regions between yokes 46 and frame 44 are constructed in such a fashion that these yokes can be repositioned relative to one another to deal with different specific column/beam-mount assembly practices, in each of which, next-adjacent yolks are preferably spaced apart, essentially, by an appropriate single story-height which is to be associated with the frame structure into which a column to be processed in jig 42 is to be employed. This is the condition which is illustrated in FIG. 2 with respect to a column which is essentially the same as the column pictured in FIG. 1. The column shown in FIG. 2 is thus also given the reference numeral 32.

According to the invention, jig 42 accommodates the precision placement of clusters of beam mounts on and along the outside column surfaces at distributed locations along the length of column 32, and in a manner which permits all of this activity to take place preferably at an off-site controlled manufacturing facility wherein, if desired, robotic and computer-controlled devices may be employed for precision and efficiency of operation. Accordingly, in such a setting, frame 44 in the jig would typically be anchored suitably to the floor of such a facility.

Figure 4:
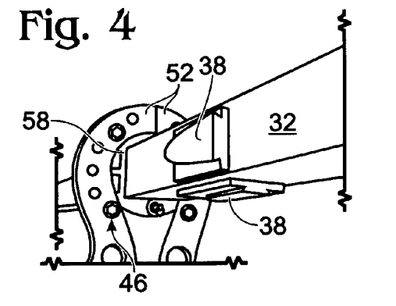
FIG. 4 is a fragmentary isometric view illustrating a portion of a column supported in the jig structure of FIG. 2, and showing portions of a cluster of beam mounts which have been attached to that column.
Figure 5:
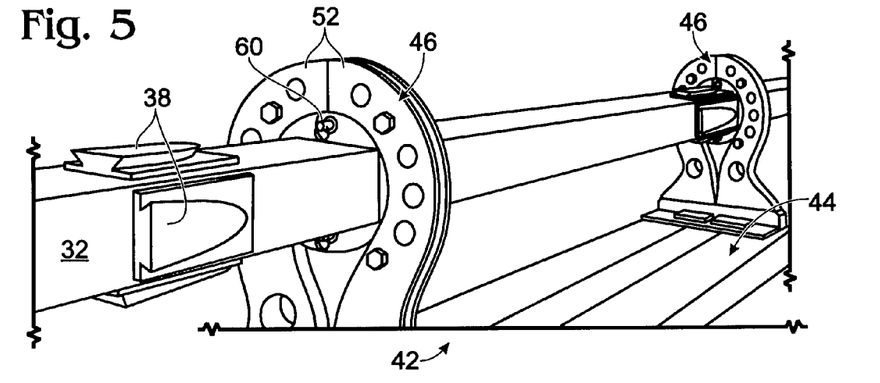
FIG. 5 is another fragmentary isometric view showing a longer stretch of a column with beam mounts attached and supported in the jig structure of FIG. 2.
Figure 6:
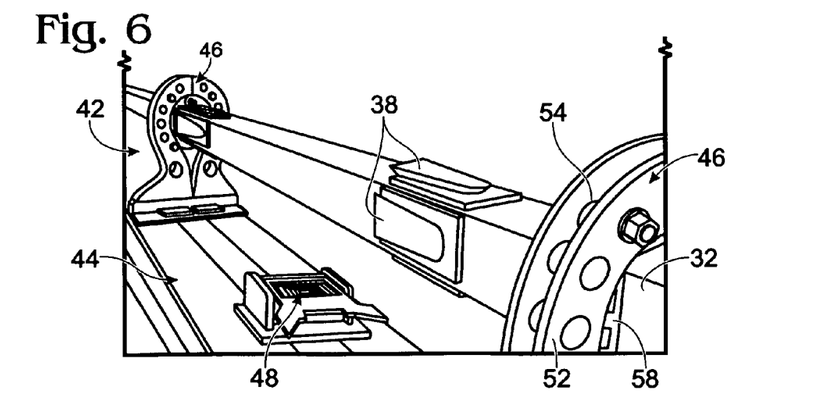
FIG. 6 is similar to FIG. 5, with the exception that near the lower left side of this figure there is shown a hinged, upwardly and downwardly swingable column support stand which is employed during initial stages of practice of the invention with respect to the jig structure illustrated in FIG. 2. This stand structure is not shown in FIG. 2.
Figures 7, 8:
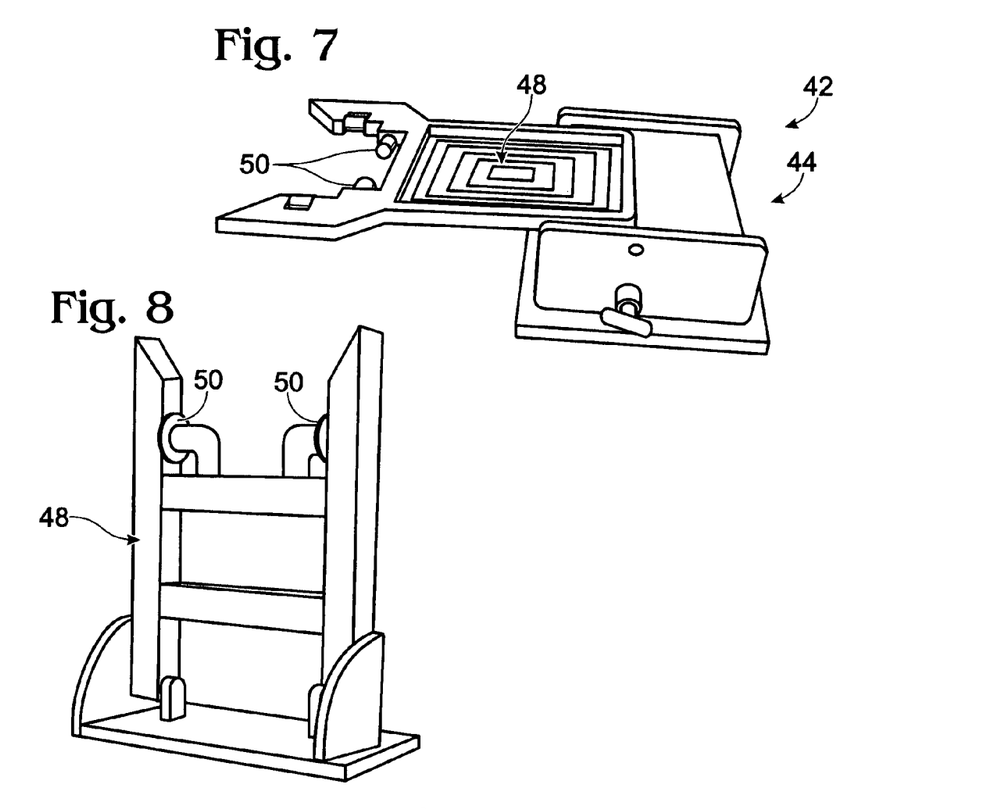
FIGS. 7 and 8 show enlarged views of the stand structure just mentioned with respect to FIG. 6, with the stand structure illustrated in FIG. 7 shown in an out-of-the-way, downwardly disposed condition in the jig structure of the invention, and with FIG. 8 illustrating the stand structure in an upright and operative condition which it occupies during initial support of a column in the jig structure of this invention.

Directing attention now to FIGS. 3-8 in the drawings along with FIG. 2, wherein components already identified are similarly marked with like reference numerals, FIGS. 6, 7 and 8 specifically illustrate what is referred to herein as hinged, swing-up/swing-down stand structure, or structures, 48 appropriately repositionably mounted at locations chosen along the length of jig frame 44. In FIGS. 6 and 7, a stand structure 48 is shown in a swung-down condition beneath a column, and in FIG. 8, a version of this stand structure is shown in a swung-up condition. Preferably stand structures, or stands, 48 are positioned adjacent opposite ends of frame 44, with a spacing between them which is slightly less than the expected overall length of the particular elongate column, such as column 32, which is going to be handled during use of the invention. FIG. 2, for simplicity of drawing purposes, does not include a showing of any stand 48. Additionally, one or more stands may be provided along the length of jig 42 at locations which lie intermediate next-adjacent yokes. FIG. 6 shows this situation in particular.

During use of Jig 42 and its associated structure, and as will shortly be more fully explained, a "raw" column which is to be processed is initially supported on these stands which are swung upwardly for this purpose. As can be seen very clearly in FIGS. 7 and 8, stands 48 include pairs of idler rollers 50 which, under the column-supporting condition just described, support a column from end-to-end for longitudinal, lateral movement to establish an appropriate longitudinal position for the column relative to the components of jig 42. A column so supported is described herein as being held on these stands initially at a certain predetermined elevation which, in the case now being described, is at some appropriate elevation above frame 44. The actual elevation is not critical, but what is important, as will become apparent, is that this height is slightly below the ultimate height which a column will have when it is fully installed and rotationally supported in jig 42 for processing in accordance with the invention.

With reference now particularly to FIGS. 10-13, inclusive, along with FIG. 2, yokes 46 are seen to include each a pair of pivoted, openable and closeable swing arms, such as arms 52, each of which carries a pair of idler rollers, such at the rollers shown at 54. The central one of the three yokes shown in FIG. 2 is illustrated with its swing arms open, and the other two yokes in this figure are shown with their swing arms closed.

Figure 10:
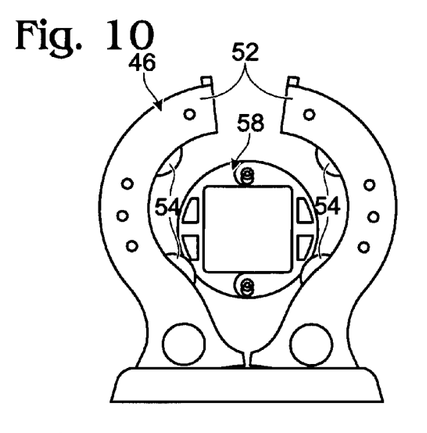
FIG. 10-13, inclusive, illustrate different conditions of, and components contained within, swing-arm yoke structure which is employed in the jig structure of this invention with respect to attached guide ring structures such as the guide ring structure pictured in FIG. 9.
Figure 11:
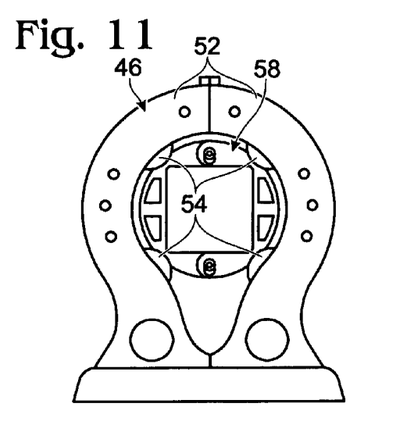
Figures 12, 13:
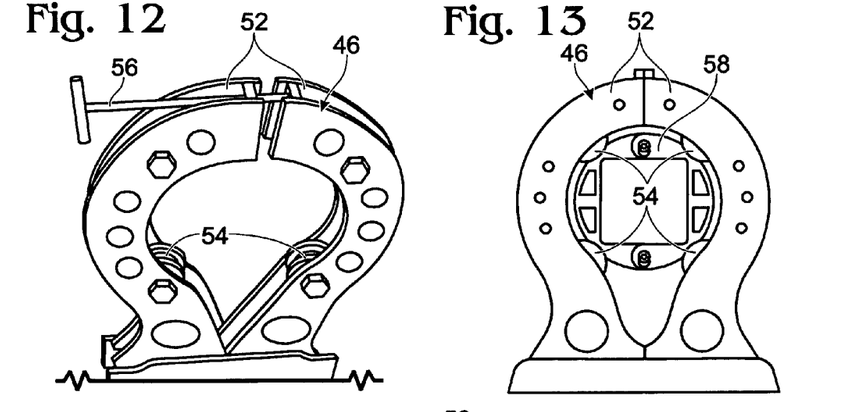
Figure 14:
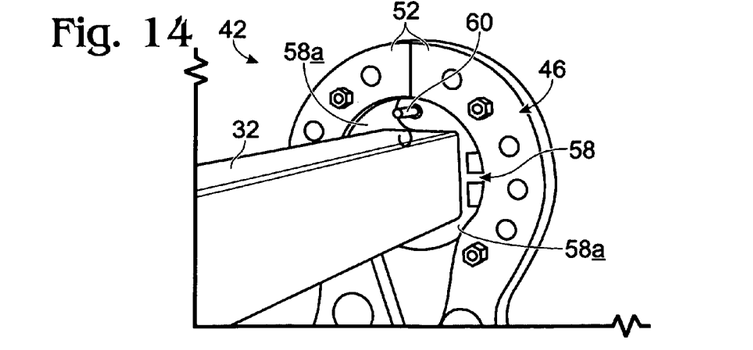
FIGS. 14 and 15 are fragmentary isometric views illustrating an elongate column supported through guide rings and yokes such as those illustrated in FIGS. 9-13, inclusive.
Figure 15:
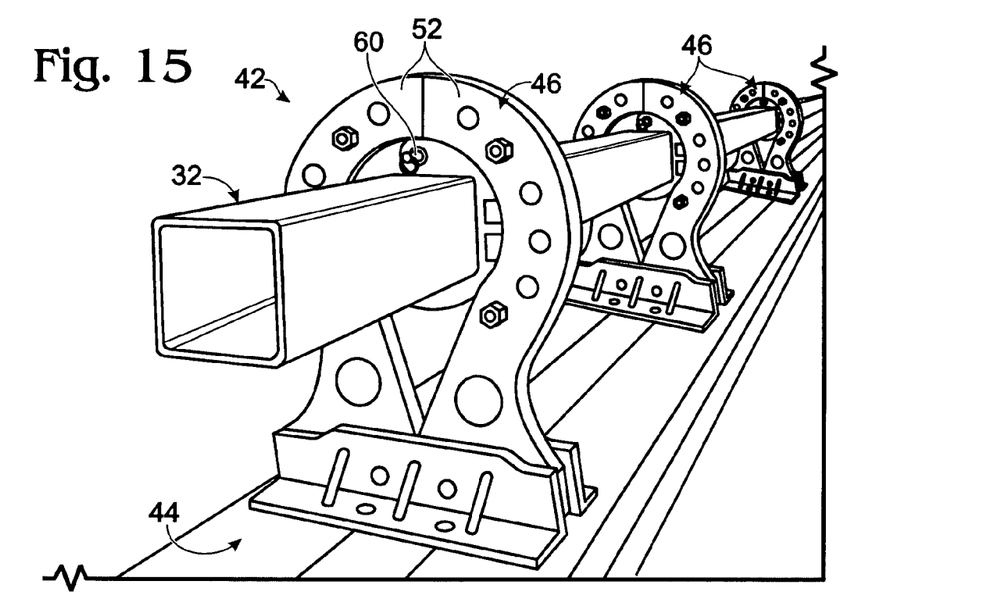
Figure 16:
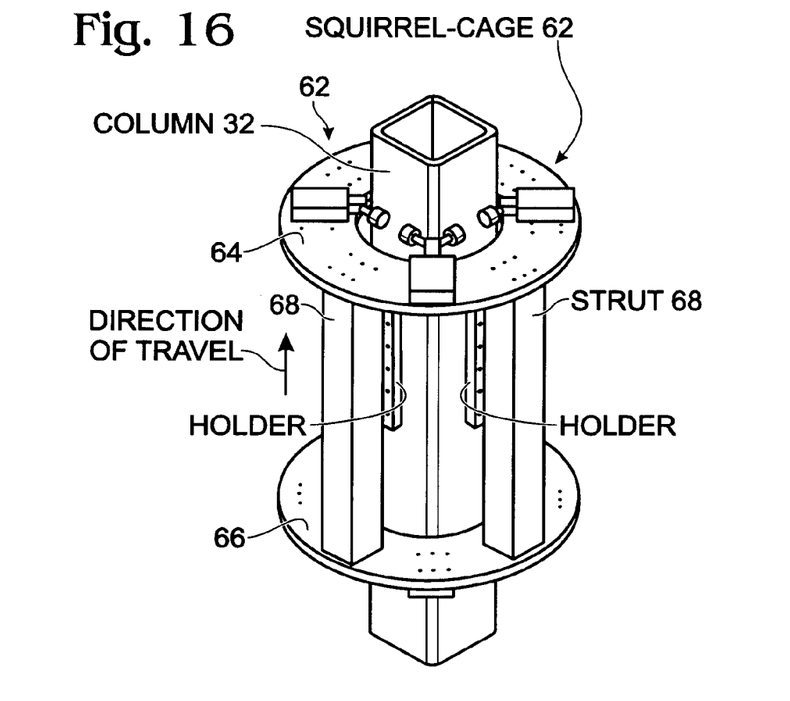
FIGS. 16, 17, and 18 illustrate in an isometric view, in an axial end view, and in a side elevation, respectively, the fundamental preferred structure of a carriage which is employed with respect to the jig structure of FIG. 2 in the practice of the present invention.
Figure 17:
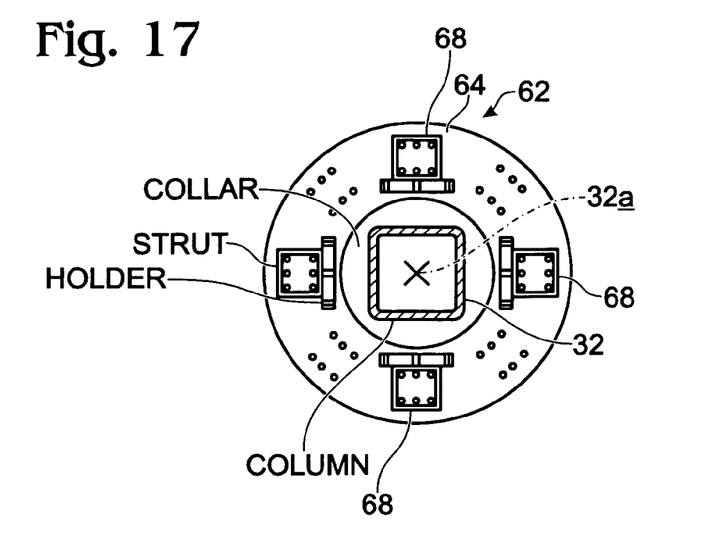
Figure 18:
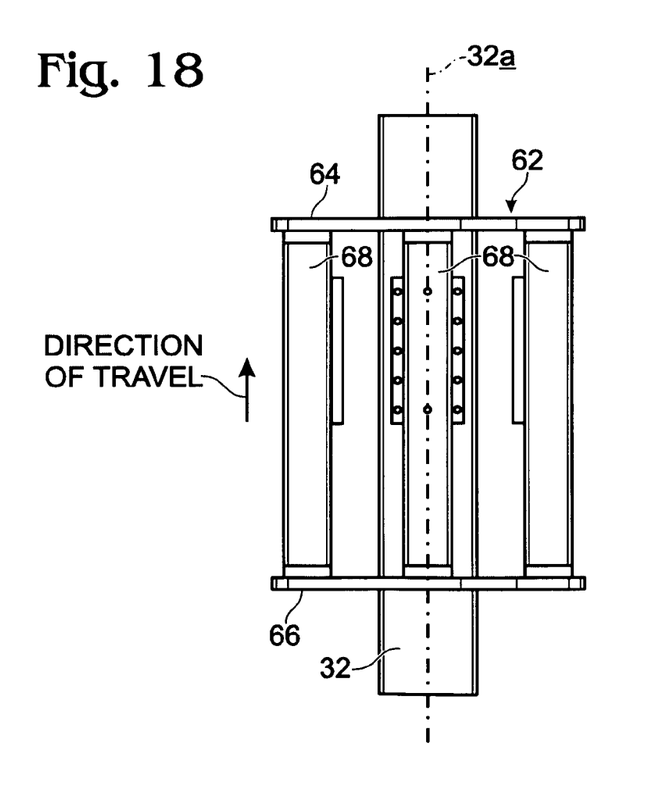

In FIGS. 11 and 13, swing arms 52 are shown closed, and in FIGS. 10 and 12, the arms are shown in degrees of openness which are less than the openness shown for the arms in the central yoke pictured in FIG. 2. In FIG. 12 in the drawings, with respect to the two arm-carried idler rollers 54 which are shown in that figure, one can see that each of these rollers is formed with circumferential flanges that define opposite sides of a perimetral channel on the circumferential outside of each roller 54. The purpose for these flanges and the associated channels will be explained shortly.

FIG. 12 illustrates at 56 an appropriate screw-adjustment device which can be employed, as will be described shortly, to complete final closing, and closed-locking, of the swing arms in each yoke.

Figure 9:
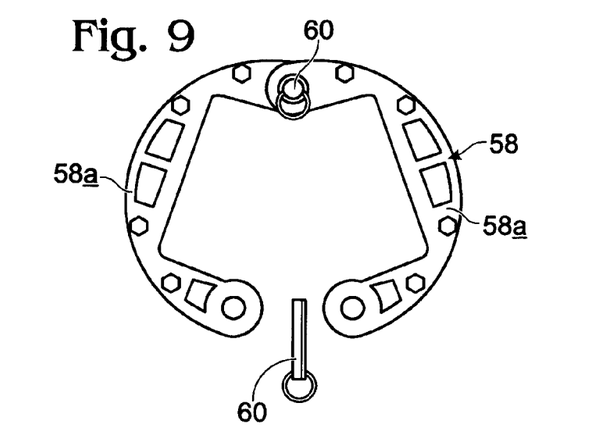
FIG. 9 is an isolated view of pin-together guide ring structure components which are employed on the outside of a column during practice of the present invention with respect to the operation of the jig structure of FIG. 2.

Looking especially now at FIG. 9 in the drawings, shown there generally at 58 is a guide ring, or guide ring structure, which is employed in the vicinity of each yoke 46, and which is attached to the outside of a column intended to be processed in jig 42. As can be seen, each ring 58 is formed as a pair of components 58a which are releasably held together through removable pins 60.

In practice, and while a column 32 is supported on stands 48, rings, such as ring 58, are attached to the outside of the column at locations which are transversely aligned with the then open arms of yokes 46, and in particular, transversely aligned with the perimetral channels that are formed on the outsides of arm rollers 54. With column 32 in place on stands 48, and guide rings 58 installed appropriately, swing arms 52 are brought together to close these arms. With closure of arms 52, and with respect to the idler rollers carried on each such arm, the lower idler rollers first engage the circular perimeters of the guide rings (see FIG. 10), and with continued closing of the yoke swing arms, these first-engaged arm rollers lift the collars and the beam upwardly away from stands 48. Stands 48 are then lowered. Fully lifted column 32 is illustrated in FIGS. 4-6, inclusive, 13-15, inclusive, and 21-23, inclusive. The yoke arms are locked in closed conditions in any suitable manner, as by operation of screw-adjustment devices like that shown at 56 in FIG. 12.

Figure 19:
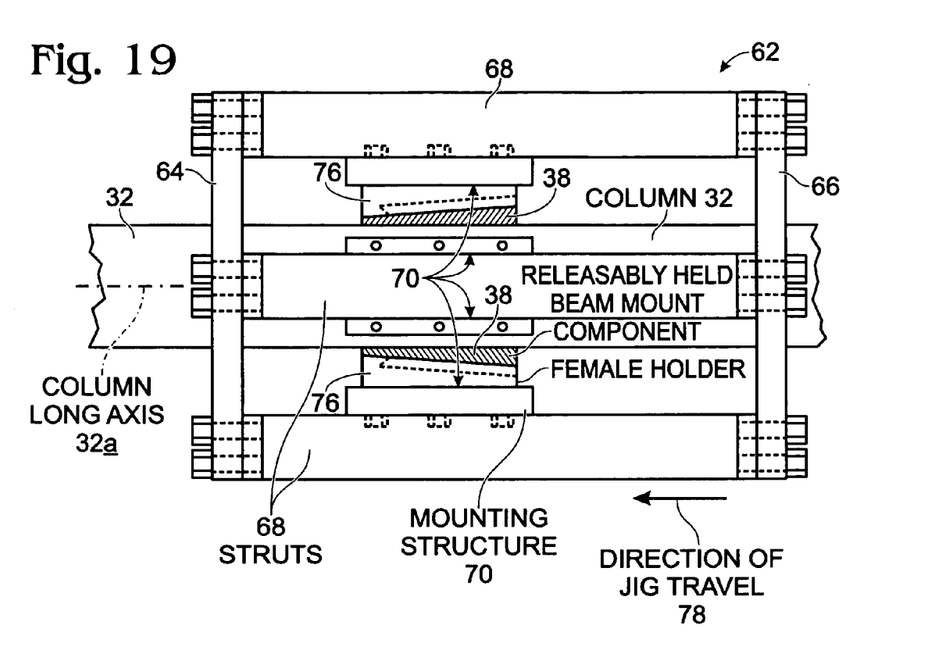
FIG. 19 is an enlarged and simplified side view of the carriage of FIGS. 16-18, inclusive, illustrating structure employed in that carriage for enabling arming of the carriage of this invention with beam mounts in an orthogonally related cluster of such mounts intended for deployment-attachment, in accordance with use of the present invention, to the sides of a structural column.
Figure 20:
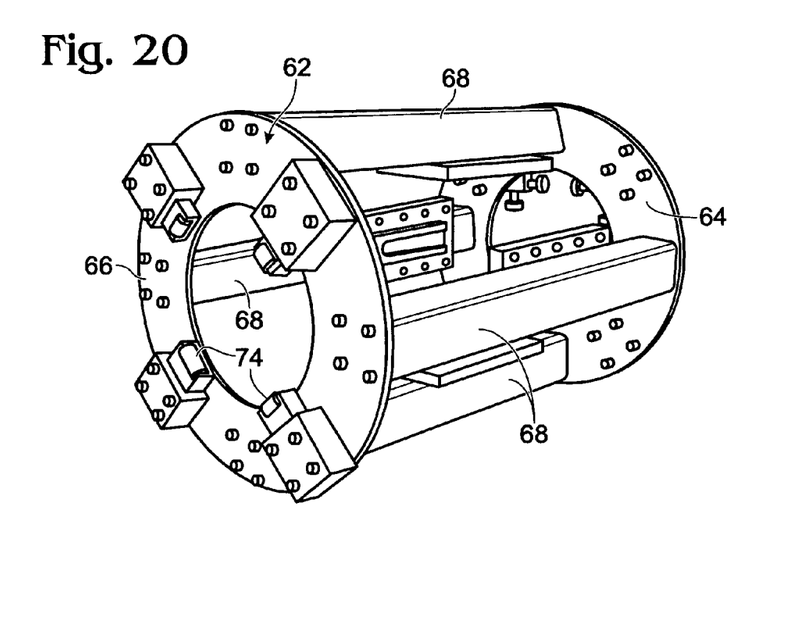
FIG. 20 presents an isolated isometric view of the just-mentioned carriage structure of the invention.
Figure 21:
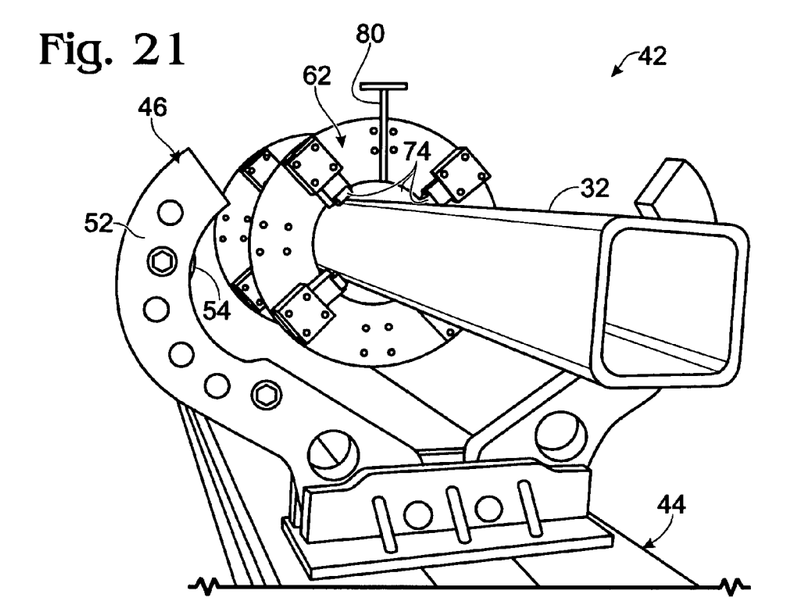
FIG. 21 illustrates, fragmentarily, and in an isometric presentation, the carriage of this invention mounted for shifting and translation along an elongate column with respect to an opened set of swing arms in a yoke structure which forms part of the jig structure of FIG. 2.

Turning attention now to FIGS. 2 and 16-23, inclusive, here illustrated is a squirrel-cage carriage 62 which plays an important role in the operation of the structure of the present invention. In FIGS. 2, 16-19, inclusive, and 21-23, inclusive, carriage 62 is shown mounted for low-resistance translational shifting along the length of column 32. In FIG. 20, carriage 62 is shown a separate and isolated structure.

Carriage 62 includes a pair of opposite-end circular plates 64, 66 which are annular in configuration, and which are joined through four, elongate, orthogonally (relative to the carriage's non-illustrated long axis) distributed struts 68. Plate 64 defines what is referred to herein as the downstream end of carriage 62, and plate 66 defines the upstream end of the carriage. The terms "upstream" and "downstream" are also applied herein with respect to the status of a column, such as column 32, which is placed in jig structure 42. More specifically, the left end of column 32, as such in shown in FIG. 2, is referred to as the upstream end of the column, and the right end as shown for the column in FIG. 2 is referred to as the column's downstream end.

Appropriately mounted on struts 68, closer to plate 64 than to plate 66, is mounting, or deploy-attachment staging, structure 70 (see particularly FIG. 19) which is designed to accommodate so-called "arming" of carriage 62 with a precision-positioned cluster of plural beam mounts 38 disposed in an orthogonal relationship about the long axis of carriage 62. FIG. 19 specifically illustrates a pair of beam mounts 38 so arming carriage 62 on two of the mounting structures 70 which are shown in this figure.

Figure 22:
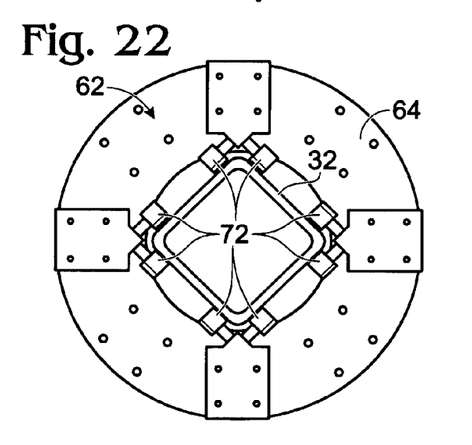
FIGS. 22 and 23 illustrate opposite end views of the carriage of the present invention, showing the locations of idler rollers which support opposite ends of the carriage for shifting and translation along a column during practice of the invention.
Figure 23:
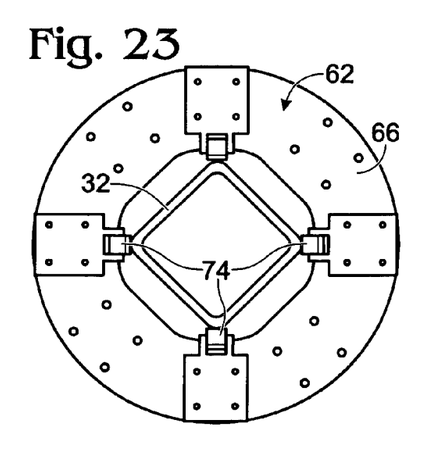

Appropriately mounted on downstream carriage plate 64 are four sets of idler rollers 72, and appropriately mounted on upstream carriage plate 66 are four sets of idler rollers 74 (see especially FIGS. 22 and 23). Important to notice here is that idler rollers 72 are arranged to ride on the outside faces of column 32, whereas idler rollers 74 are designed to ride on the corners of intersection between adjacent faces in the column. This arrangement allows appropriate translational downstream shifting of carriage 62 along the length of column 32 during processing. More specifically, it allows the carriage to travel along a column without any part of it striking any just-installed (deployed-attached) cluster of four beam mounts 38. FIGS. 22 and 23 clearly illustrate this important disposition of idler rollers 72, 74.

Turning attention for a moment specifically to FIG. 19, what one will observe here is that each of mounting structures 70 is formed with a component 76 which has a structure somewhat like that of previously mentioned beam-end components 40 shown in FIG. 1, whereby beam mounts 38 can be put into position for deployment-attachment to the sides of a column in a manner which engages these beam mounts much like that engagement which exists between the inner and outer collar components pictured in FIG. 1. It will further be observed, particularly with reference to FIG. 19, where the direction of carriage travel along column 32 is shown by an arrow 78, that when carriage 62 is moved downstream along column 32 (to the left in FIG. 19), mounting structures 70 and beams mounts 38, if the latter have been attached to the side of column 32, separate and become free from one another, with the beam mounts 38 remaining appropriately in place as deployed and attached on the outer sides of column 32.

Describing now one preferred manner of employing the apparatus of the present invention, when jig structure 42 is put to use with respect to deploy-attaching clusters of beam mounts along a column, that column is placed on the previously mentioned stands in jig 42, with all of the yoke arms in fully opened conditions. Guide rings 58 are appropriately installed on the outside of the supported column, and when this has been accomplished, carriage 62 is appropriately mounted on the column adjacent the column's upstream end. Carriage 62 is translationally shifted along the column to position the carriage appropriately near the first longitudinal location (column attachment site) along the supported column wherein a set of beam mounts is first to be deployed-attached to the supported column. Positional registration and positional locking for the thus shifted carriage is accommodated by a manually moveable latch pin, such as pin 80 shown in FIGS. 2 and 21, with the free end of this pin which is disposed toward the supported column driven downwardly into appropriate accommodating bores, such as bores 82, which have been appropriately prepared in a side of the supported column.

The swing arms in the yokes are then closed upon one another and locked in closed conditions. Closure of these arms lifts the now fully captured column upwardly away from the stands, and the stands are folded down so as to be out of the way for further practice of the invention.

The carriage's beam-mount mounting structures 70 are now armed with a cluster of four beam mounts. With the carriage thus armed and equipped with a cluster-set of four beam mounts, and with these beam mounts properly positioned for deployment-attachment to the sides in column 32, welding is performed to secure the mounts in place. A very useful feature of the present invention is that the jig and carriage described herein, when in cooperative use with one another, result in each cluster of deployable-attachable carriage-carried beam mounts being disposed at locations which are relatively closely adjacent one of yokes 46. A result of this is that, when welding is performed, the subject column is supported by a closely adjacent yoke 46, which condition provides good anti-heat-distortion stabilization for the column.

When a full set of four mounts in a cluster has been attached to the faces in column 32, the nearby downstream yoke is opened, the associated guide ring is removed from the column, and carriage 62 is translationally shifted in a downstream direction along the column, with the column acting as a travel way for the carriage.

The carriage is stopped at the next installation site along the column, armed with a new cluster-set of beam mounts 38, registrationally anchored in place by pin 80, and the new cluster-set of beam mounts 38 is then deployed-attached to the sides in the column.

Figure 24:
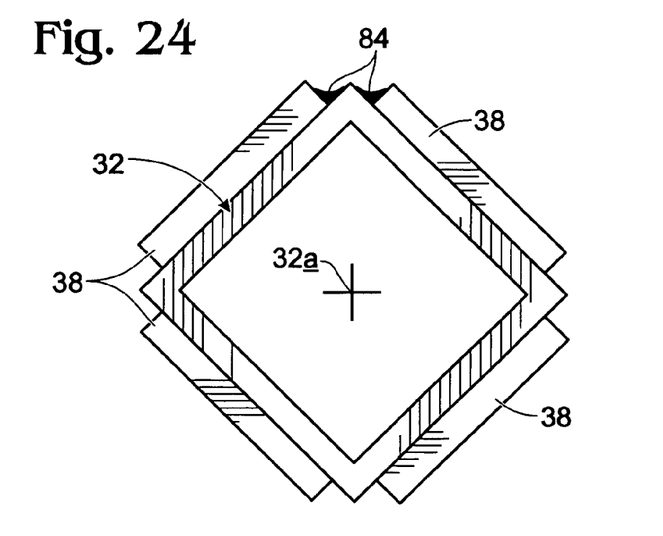
FIG. 24-26, inclusive, illustrate two different representative rotational weld attachment procedures which may be implemented in accordance with use of the present invention.
Figure 25:
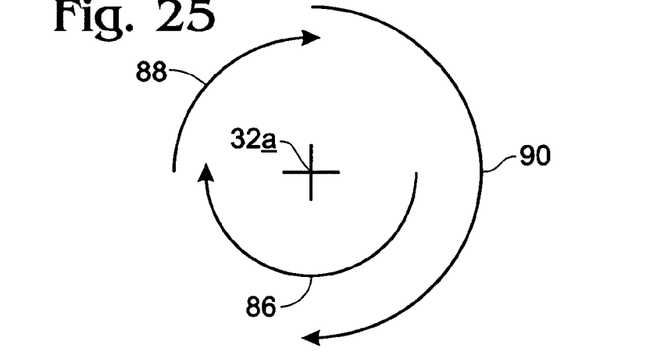
Figure 26:
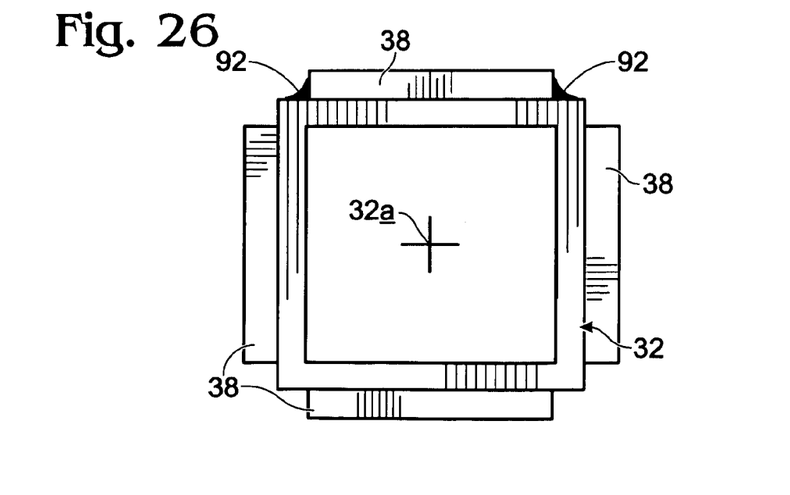

According to the invention, at each positional location of the carriage for the deploy-attaching of a cluster of beam mounts, beam and carriage rotation is carried out about the longitudinal axis of the column, which axis is shown at 32a in FIGS. 2 and 24-26, inclusive, in the drawings. Because of the nature of the relationship which then exists between carriage 62 and column 32, with a cluster-set of beam mounts arming the carriage, rotation of the beam about its own long axis causes the carriage to rotate as a unit with the column. FIGS. 24-26 illustrate two ways of usefully implementing such rotation.

Reading FIGS. 24 and 25 together, one deploy-attaching approach proposed by the invention involves orienting the column and carriage to a rotational condition with a facial corner of the column facing directly upwardly. Welds are created at the darkened locations shown at 84 in FIG. 24. The column and carriage are then immediately rotated 180° about axis 32a, as suggested by curved arrow 86 in FIG. 25.

Welds are then performed at the same relative locations adjacent the opposite facial corner of the column, following which the beam and carriage are rotated a second time through a 90° arc, as suggested by curved arrow 88 in FIG. 25, and a final set of welds is created.

Following welding after this second rotation, the column and carriage are rotated a third time—this time again through an arc of 180°, as suggested by curved arrow 90 in FIG. 25.

All appropriate welds have thus now been performed for a given single cluster set of beam mounts, which mounts are now said to have been deployed-attached relative to the carriage and column. Carriage and beam rotation as just described helps to assure beam-configuration stabilization during the mentioned heated welding operations.

Where, at first if desired, only tack welds are performed, with full welds later being performed, a similar pattern of rotation preferably takes place for the same reason.

Referring to FIGS. 25 and 26 together, another deploy-attaching approach is here illustrated. In this approach, pairs of welds are created as illustrated by darkened welds 92 shown in FIG. 26. The rotations just described above are also preferably employed similarly in this approach.

Yet another operation which may conveniently be employed during use of the apparatus of this invention is illustrated by an arrow 94 shown pointing toward the left end of column 32 in FIG. 2. Arrow 94 represents the creation of a pre-heating and/or cooling gas flow through the hollow interior of column 32.

A unique structure/apparatus has thus been described and illustrated for promoting the precision deploy-attaching of beam-mount structure to the outer sides of an elongate column. And, while a preferred and best-mode embodiment of this apparatus has specifically been presented herein, it is appreciated that variations and modifications may be made without departing from the spirit of the invention.

I claim:

1. Apparatus for deploy-attaching beam-mount structure to the outside of an elongate column at plural, defined attachment sites that are distributed and spaced along the length of the column comprising a frame, column support structure mounted on said frame and designed to support, releasably, an elongate column with that column's long axis disposed generally horizontally, and a carriage mountable for translation on and along a column supported by said column support structure, with the column acting as a travel way for said carriage, and with said column support structure being designed to accommodate shifting of the carriage progressively along the length of a supported column, said carriage including deploy-attachment staging structure adapted to support/transport releasable beam-mount structure for deploy-attachment to such defined attachment sites on a column supported by said support structure, wherein said column support structure takes the form of a plurality of spaced and distributed support yokes having openable/closeable swing arms which are closeable to circumsurround the long axis of an elongate column supported on said support structure, and which further includes circular-perimeter guide rings which are releasably attachable to the outside of a supported column each in a manner circumsurrounding the long axis of the column, and said arms carry idler rollers adapted, with closing of the arms around a column, to engage and capture the circular perimeters of said guide rings, thus to permit selectable rotation of a guide-ring-supported column within the yoke and about the long axis of the supported column.

2. The apparatus of claim 1, wherein passage, during shifting of the carriage along a supported column past a support structure is accommodated by opening of the swing arms in that structure.

* * * * *